United States Patent [19]

Richards et al.

[11] Patent Number: 5,833,863
[45] Date of Patent: Nov. 10, 1998

[54] CONCRETE RECLAMATION SYSTEM

[75] Inventors: Michael J. Richards, Woodlands; James R. Dial, Willis, both of Tex.

[73] Assignee: Tuboscope Vetco Int'l Inc., Houston, Tex.

[21] Appl. No.: 844,586

[22] Filed: Apr. 21, 1997

[51] Int. Cl.$^6$ ..................................................... C02F 1/38
[52] U.S. Cl. ......................... 210/712; 210/723; 210/724; 210/738; 210/781; 210/787; 210/804
[58] Field of Search .................................. 210/712, 723, 210/724, 738, 781, 787, 800, 804, 805, 806

[56] References Cited

U.S. PATENT DOCUMENTS

| | | | |
|---|---|---|---|
| 4,548,507 | 10/1985 | Mathis et al. | 366/20 |
| 5,149,192 | 9/1992 | Hamm et al. | 366/8 |
| 5,268,111 | 12/1993 | Metz et al. | 210/112 |
| 5,492,620 | 2/1996 | Evans | 210/202 |
| 5,685,978 | 11/1997 | Petrick et al. | 210/241 |
| 5,699,969 | 12/1997 | Isaji | 241/24.12 |

OTHER PUBLICATIONS

Phoenix Process Equipment Co., "High Rate Thickener" brochure.
HS–3400 Decanting Centrifuge, The Brandt Co., 1995.
SDW–25 System, Brandt/EPI, 1995 (ignore X's on back side).
Vacuum Assisted Cyclone Separator, Brandt/EPI, 1996.
Reclaim lost Concrete material profits, The Vince Hagar Co., 1995.
Redi–Claim, Jadair Inc., 1995.
The Time Machine For Concrete, Rapid Int'l. Ltd., 1995.
Concrete Reclaimer, Rapid Int'l. Ltd., 1995.
We Will Put Out Money Where Our Mouth Is, Henry Mfg. Co., 1995.
Readymix Reclaim System Model 604, Linatex Corp. of America, 1990.
Type TK Automatic High–Speed Filter Press for Ready–Mixed Concrete Plants, Onoda Corp., 1995.
U.S Official Gazette—Patents—entries for U.S. 5,641,397; 24 Jun. 1997, U.S. 5,641,249; 24 Jun. 1997, U.S. 5,641,071; 24 Jun. 1997.

Primary Examiner—Jay H. Woo
Assistant Examiner—Betsey J. Morrison
Attorney, Agent, or Firm—Guy McClung

[57] ABSTRACT

The present invention discloses, in certain embodiments, a method for treating a concrete slurry to recover constituents thereof, the constituents including water, coarse aggregate, fine aggregate, and cement solids, the method comprising removing aggregate from the concrete slurry with aggregate separation apparatus, the aggregate separation apparatus producing a secondary slurry containing cement solids, feeding the secondary slurry to a clarifier in which cement solids settle out from the secondary slurry to a bottom of the clarifier and a liquid which is primarily water is disposed above the cement solids, removing the liquid from the clarifier, feeding settled out cement solids in liquid from the clarifier to a centrifuge, separating settled out cement solids from the liquid in the centrifuge producing an amount of liquid and an amount of settled out cement solids with liquid. In one aspect the settled out cement solids in liquid fed from the clarifier to the centrifuge comprise at most about 20% of the secondary slurry fed to the clarifier. In one aspect a dewatered cement paste is produced which is at most about 60% water by weight. The present invention discloses recovered cement solids recovered by methods according to the present invention.

18 Claims, 2 Drawing Sheets

CONCRETE RECLAMATION SYSTEM

BACKGROUND OF THE INVENTION

1. Field of the Invention

This invention is directed to systems and methods for dewatering materials and to concrete reclamation; reclamation of components of concrete mixtures; treatment of components of such mixtures; and disposal thereof.

2. Description of Related Art

Often part of an order of concrete sent to a construction or highway site is not used and is returned to a concrete production plant or disposal site in a truck or other container. In some situations, returned concrete is simply dumped, allowed to dry, and then hauled off. In certain situations, due to environmental, space, or economic concerns, this procedure cannot be followed. Much concrete has a high pH value and, when contacted by rainwater or wash-down water, is elevated in pH producing a material that may be hazardous. Such material has to be contained and treated prior to disposal.

Certain types of concrete currently available cost about $50 to $60 (retail) per cubic yard. Such a cubic yard of material has about $5 to $15 worth of rock and sand. Following reclamation of such rock and sand, a cement slurry remains which must be dewatered, allowed to dry, and is then disposed of in a certified location.

Any remaining effluent, e.g. liquid (e.g. non-potable water) is re-used to produce additional concrete in a reclamation system. Alternatively such water is chemically treated for disposal at an approved site or in an approved waste or storm sewer. Different concrete plants produce different types of concrete and, following transport to a job site, receive back different amounts of returned product for treatment and disposal. Typically an average cubic yard of concrete weighs about 3500 pounds, of which about 1500 pounds is coarse aggregate (e.g. rock between +4 sieve size or mesh and −2 inches, i.e. the pieces have a largest dimension of 2 inches and the pieces with a smallest dimension are captured on a 4 mesh screen) about 1500 pounds is fine aggregate (e.g. rock and sand between +200 mesh and −4 mesh); about 300 pounds is water, and the remainder comprises injected air and soaps as desired; binders; cement; fly ash; fiber; and various chemicals. Aggregate particle size ranges include boulders, cobbles, coarse aggregate, fine aggregate, and mineral filler, which are defined in terms of particle size as follows:

| Designation | Size Range |
| --- | --- |
| Boulders: | 6 inches and larger |
| Cobbles: | 3 to 6 inches |
| Coarse aggregate: | No. 4 sieve size to 3 inches |
| Fine aggregate: | No. 200 to No. 4 sieve sizes |
| Mineral filler: | Smaller than No. 200 sieve size |

Boulders and cobbles are found in naturally occurring deposits. They can be crushed and sized to produce coarse and fine aggregate. Mineral filler is a flour-size material that is produced from aggregate crushing and processing.

Aggregate is used as a component of portland cement concrete (PCC), asphalt concrete, or in other construction materials. Aggregate represents 70 to 85% by weight (60 to 75% by volume) of PCC and 90 to 95% by weight (75 to 85% by volume) of asphalt concrete mixtures. The workability, strength, durability, moisture susceptibility, and performance of these construction materials are influenced greatly by the aggregate characteristics.

The characteristics of aggregate used in both PCC and asphalt concrete must be specified and tested to ensure adequate quality for the intended use. Aggregate supplies are developed from sources such as: quarry rock, boulders and cobbles, gravel, sand, and slag. These sources of aggregate can consist of a variety of parent rocks and minerals. They may exist as a singular rock and mineral type or as mixtures. The physical and chemical characteristics of an aggregate influence its use as an engineering construction material. Separate as well as common aggregate characteristics are important for both PCC and asphalt concrete performance.

A Schwing RA-10 Recycler System from Schwing America, Inc. has a rotating inclined drum, e.g. with a ten horsepower main drive, with a counter-current wash system for washing aggregate conveyed from the drum. Reclaimed aggregate is sized on a single panel vibrating screen and a remaining slurry is gravity fed to holding cells or pumped for re-use if it meets required specifications.

A Craigovan System is mounted on a single skid and washes and classifies aggregate for recovery. Primary washing occurs in a dump point receiving pan with a plurality of spray nozzles that wash incoming concrete slurry. Washed slurry and aggregate flows to a main vessel wherein additional washing occurs with water from nozzles and coarse aggregate extraction is done with a rotating trommel screen system (e.g. at about 4 mesh). A lower trommel portion is submerged in the liquid-filled main vessel. One or two inclined screw classifiers is attached directly to the bottom of the main vessel to remove sand from the slurry in the vessel. The slurry is cleaned so that material above 200 mesh is removed. One or more hydraulic motors drive or rotate a rotating drum belt convey or that moves material from the rotating drum. This system accomplishes dewatering of aggregate with the trommel screen and the classifiers. Such a system does not produce clarified water, and does not produce dewatered cement or a dewatered cement paste.

Onoda Corporations Type TK concrete reclamation system produces a dewatered cement paste with a filter press. Use of the filter press requires that materials to be filtered remain in suspension in a slurry, i.e., that solids to be removed do not settle out from the slurry prior to introduction of the slurry to the filter press. Consequently, the Onoda system has an agitator tank to maintain the solids in suspension. Also, the entire slurry is fed to the filter press and the filter press must process the entire slurry.

For many years there has been a need for a concrete reclamation system whose components are easily transportable, that is easy to operate, simple to maintain, flexible enough to accommodate various amounts of concrete, and efficient for the reclamation, treatment and proper disposal of materials. There has long been a need for such a system which efficiently produces dewatered cement.

SUMMARY OF THE PRESENT INVENTION

The present invention, in certain embodiments, discloses and teaches a system and method for treating concrete, in one aspect to dewater it, in one apsect to reclaim constituents thereof, and in one aspect to preparing certain of the constituents for either reuse or safe disposal. In one aspect such a system includes: aggregate separation apparatus which produces aggregate and a remaining slurry (containing cement solids, e.g. cement and sand) from a concrete slurry; separator apparatus for separating liquid and solids in the remaining slurry; optional apparatus for injecting a coalescing material, e.g. a polymer or flocculant, into liquid from the separator apparatus; clarifier apparatus for producing liquids, e.g. water, which is removed from the remaining slurry; and dewatering apparatus (including, but not limited to, a filter press or a centrifuge) for receiving flocculated solids from the clarifier apparatus to dewater the remaining slurry and to remove the solids, producing a disposable dewatered cement paste. In one aspect such a system is located at the site of concrete usage so it is not necessary to transport unused concrete back to a concrete production plant.

In one aspect such a system includes pH adjustment apparatus to treat the liquid (e.g. water) from the clarifier apparatus. In another aspect, such a system has filtration apparatus for filtering the liquid (primarily water) from the clarifier apparatus.

The present invention, in certain aspects, discloses a method for treating a concrete slurry to recover constituents thereof, the constituents including water, coarse aggregate, fine aggregate, and cement solids, the method including removing aggregate from the concrete slurry with aggregate separation apparatus, the aggregate separation apparatus producing a secondary slurry containing sand and cement solids, feeding the secondary slurry to a clarifier in which cement solids settle out from the secondary slurry to a bottom of the clarifier and a liquid which is primarily water is disposed above the cement solids, removing the liquid from the clarifier, feeding settled out cement solids in liquid from the clarifier to a centrifuge, separating settled out cement solids from the liquid in the centrifuge producing an amount of liquid and an amount of settled out cement solids with liquid; such a method including removing aggregate including removing coarse aggregate with screening apparatus, and removing fine aggregate with a hydrocyclone separator, the hydrocyclone separator producing the secondary slurry; such a method wherein the secondary slurry is at most about 8% cement solids by weight; any such method including prior to feeding the secondary slurry to the clarifier, feeding the secondary slurry to mixing apparatus to homogenize the secondary slurry, and homogenizing the secondary slurry with the mixing apparatus; any such method including adding additional water to the secondary slurry in the mixing apparatus to facilitate homogenization; any such method including adding flocculant to the secondary slurry to facilitate flocculation of cement solids in the secondary slurry; any such method wherein the flocculant is added prior to feeding the secondary slurry to the clarifier; any such method wherein the settled out cement solids in liquid fed from the clarifier to the centrifuge comprise at most about 35% of the secondary slurry fed to the clarifier; any such method wherein the settled out cement solids in liquid fed from the clarifier to the centrifuge comprise at most about 20% of the secondary slurry fed to the clarifier; any such method wherein the amount of settled out cement solids with liquid produced by the centrifuge is at most about 40–60% water by weight; any such method wherein the amount of settled out cement solids with liquid produced by the centrifuge is at most about 2% water by weight; any such method wherein the amount of liquid produced by the centrifuge is at least about 65% of the secondary slurry fed to the clarifier; any such method wherein the amount of liquid produced by the centrifuge is at least about 80% of the secondary slurry fed to the clarifier; any such method wherein the amount of liquid produced by the centrifuge is at least about 98% water by weight; any such method wherein the water is re-usable to make a concrete mixture; any such method including feeding the amount of liquid produced by the centrifuge to pH adjustment apparatus to adjust pH of the amount of liquid to between about 7 and about 8; any such method including feeding the amount of liquid produced by the centrifuge to filtration apparatus, the liquid containing suspended solids, the filtration apparatus for filtering out from the liquid about 99% by volume of the suspended solids; and any such method wherein the mixing apparatus is a tank with at least one agitator therein and the method includes agitating the secondary slurry in the tank with the agitator to homogenize the secondary slurry.

It is, therefore, an object of at least certain preferred embodiments of the present invention to provide:

New, useful, unique, efficient, nonobvious systems and methods for treating concrete to dewater materials therein and, in one aspect, to reclaim constituents thereof for re-use and/or safe disposal;

Such systems that produce a safely disposable dewatered cement paste; and

Such systems which are economical, easily installed, easy to operate, and/or able to accommodate varying amounts of concrete.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
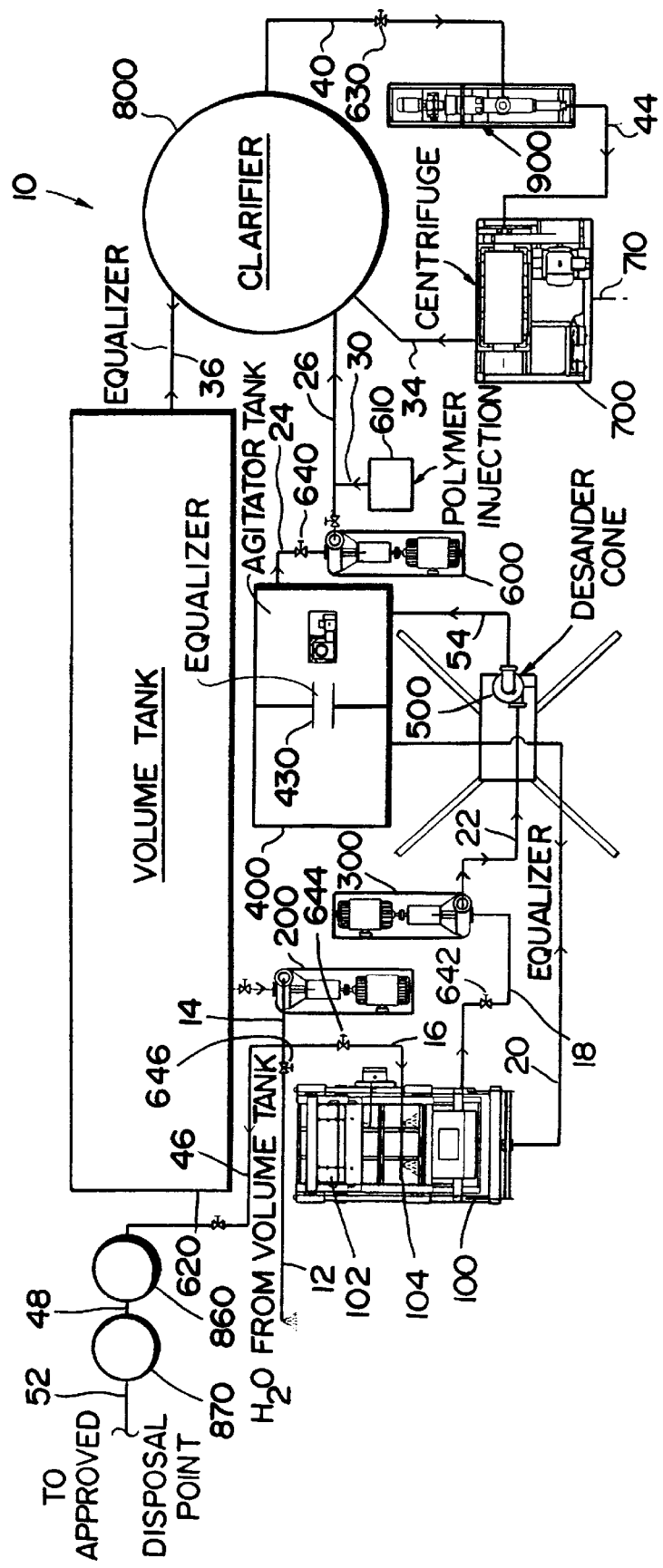
FIG. 1 is a top schematic view of a system according to the present invention.
Figure 2:
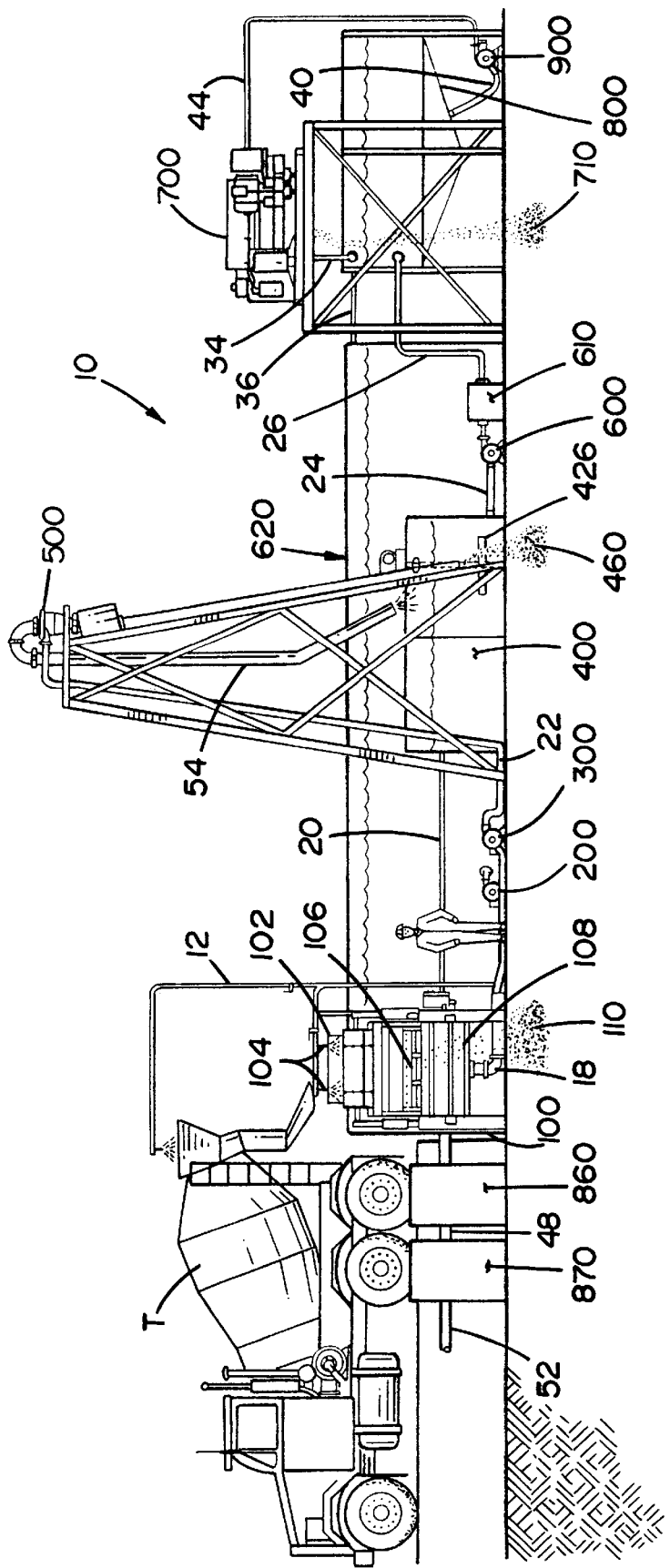
FIG. 2 is a side view of a system as in FIG. 1.

Referring now to FIGS. 1 and 2, a system 10 according to the present invention has an aggregate separator 100 (e.g., but not limited to, a commercially available Brandt/EPI SDW-25 screen system) which has an input bin or feed box 102 for receiving concrete, including (but not limited to) concrete returned in a truck T from a building site or highway/road site. Water pumped from a tank 620 by a pump 200 flows in lines 12 and 14 to flush the material from the truck T and in lines 14 and 16 to nozzles 104 to facilitate aggregate separation.

In one aspect, coarse aggregate, is retained on a screen 106 (depending on the mesh, wirecloth, and/or screening material and its size or aperture opening) [e.g. between three inches (largest dimension) and 4 mesh (about 3/16 inches)] of the aggregate separator 100. With certain concretes, such aggregate is about 45% to 50% by weight of solids in the incoming slurry from the truck T. Finer aggregate in a slurry passes through the screen 106 into a sump 108 of the aggregate separator 100. Coarse aggregate exits the system and is piled on the ground at 110 or collected in a bin.

A valve 646 controls flow in the line 12 and a valve 644 controls flow in the line 16.

A centrifugal pump 300 (e.g. a commercially available pump) pumps the slurry from the sump 108 in lines 18 and 22 to a hydrocyclone separator 500 (e.g. but not limited to, a Vacuum Assisted Cyclone separator commercially available from Brandt/EPI). In one aspect the separator 500 is a "desander cone"—a cyclone separator that recovers sand-size material. The hydrocyclone separator 500 recovers additional aggregate from the slurry, producing an overflow liquid slurry stream and aggregate. In one aspect the hydrocyclone separator recovers about 40% to 45% by weight of the aggregate that was in the slurry from the incoming truck. Fine aggregate (size −4 mesh to +200 mesh) is discharged out from the bottom of the cone of the hydrocyclone body and onto the ground (pile 460) or into a bin. The overflow liquid flows (e.g. by gravity and/or due to inertia from inside the cyclone chamber) in a line 54 to an agitator/equalizer tank 400. Liquid levels between the compartments is equalized by the interconnection via a weir 430. If the effluent (liquid) from the cyclone separator is within desired specifications for a particular type of concrete, it may be sent to a main concrete production plant for re-use. Typically this effluent (into tank 400) contains by weight up to about 45% cement and, in one aspect, about 5% to about 10% cement solids and up to about 55% water and, in one aspect, about 90% to about 95% water. Preferably liquid from the hydrocyclone separator flowing to the agitator/equalizer tank 400 contains 10% solids by weight or less and most preferably 5% or less.

In the agitator tank 400, the liquid is agitated, e.g. by a rotating propeller 426, to prevent solids in the tank from settling and to produce a thoroughly mixed mixture.

A centrifugal pump 600 pumps liquid, i.e. a cement slurry, from the agitator tank 400 to a clarifier 800 (e.g., but not limited to, a conical clarifier as shown in FIG. 3). Prior to introduction of the liquid into the clarifier 800, polymer flocculant may, optionally, be added to enhance the settling out of solids in the clarifier 800. In one aspect, the pump 200 pumps water from the tank 620 to the line 46 with valve 644 closed. Clarified water flows by gravity from the clarifier 800 in the line 36 to the tank 620 and is then pumped out from the tank 620 by the pump 200. Optionally, the water in line 46 is pumped to pH adjustment apparatus 860 to produce material with a more neutral (less basic) pH. In one aspect the water may have a pH of up to 10 and the pH is lowered to about at least 7. Also optionally the stream in line 46 may be filtered by flowing it (either directly from line 46 or via the pH adjustment 860 in a line 48) to filtration apparatus 870 and then out therefrom in a line 52. The apparatuses 860 and/or 870 may be deleted.

Solids and/or flocculated solids from the bottom of the clarifier 800 are pumped in a line 40 by a positive displacement pump 900 to a centrifuge 700 (e.g. but not limited to, a high speed centrifuge and/or a decanting centrifuge) in a line 44. The centrifuge 700 (e.g., but not limited to, a commercially available HS-3400 Decanting Centrifuge from Brandt/EPI, owner of the present invention) produces: a liquid effluent stream (e.g. in one aspect about 99% water and about 1% cement slurry by weight) that flows in a line 34 to the tank 800; and a flow of dewatered cement paste 710. Optionally, flocculant and/or coagulant may be added in the line 44 and/or into a bowl of the centrifuge itself. A valve 630 controls flow between lines 40 and 44. The dewatered cement paste 710 is preferably at most about 60% water by weight and most preferably about 40% water by weight or less.

A portion of water clarified by the clarifier 800 flows by gravity overflow in a line 36 to the tank 620, e.g. for use as wash water.

The tank 620 has a suction compartment from which the pump 200 draws liquid. The tank is used to store water produced by the system. A valve 648 controls flow from the tank 620 to the pump 200.

In one particular embodiment of the system 10 the aggregate separator 100 processes between about 40 to about 45 tons per hour of concrete or concrete mixed with water and about 65 to about 75 gallons per minute of dry solids flow into pile 110 e.g. on the ground or in a bin. The slurry in the sump 108 contains about 20% to about 24% solids by weight. The pump 300 pumps about 500 gallons per minute of slurry from the sump 108 to the hydrocyclone 500. The pump 200 may pump about 200 gallons per minute of water up to 500 gallons per minute from the tank 620 to flush the concrete and facilitate separation. The slurry from the truck contains, in this particular embodiment, about 50% solids and about one cubic yard per minute of the truck's contents is fed to the separator 100 (and combined with the added water, about 200 gallons per minute, in the line 12). The line 20 can act as a level equalizer equalizing levels by gravity between the tank 400 and the sump 108 and, in one aspect between about 75 to about 100 gallons per minute of slurry is flowable one way or the other in the line 20. In this particular embodiment the hydrocyclone 500 treats about 35 to about 45 tons per hour of slurry from the sump 108, to separate particles between 4 mesh and 200 mesh in a largest dimension, produces about 50 to about 75 gallons per minute of liquid and feeds a stream in line 54 to the tank 400 that has about 8% solids by weight. The pump 600 pumps about 500 gallons per minute of liquid slurry (that is about 5% to about 10% cement solids by weight) from the tank 400 to the clarifier 800. About one gallon per minute of flocculant is fed into the line 26. The centrifuge 700 processes about 5 to about 10 tons per hour of slurry from the bottom of the clarifier, produces about 25 to about 33 gallons per minute of concentrated cement paste which is about 40% to about 60% by weight; and about 50 gallons per minute of water flows in the line 34 to the clarifier 800. This water may be flowed to any other point in the system. Typically of the about 500 gallons per minute received by the clarifier 800, about 400 gallons per minute of water (in one aspect with some particles in it) flows to the tank 620 (e.g. by gravity in the line 630) and about 100 gallons per minute of relatively thick (about 60% to about 80% water by weight) slurry flows to centrifuge 700. Materials flow in line 54 from the hydrocyclone 500 by gravity as does the dewatered cement paste 710 from the centrifuge 700. It is within the scope of this invention to use a commercially available filter press or presses instead of or in combination with the centrifuge 700.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps.

What is claimed is:

1. A method for treating a concrete slurry to recover constituents thereof, the constituents including water, coarse aggregate, fine aggregate, and cement solids, the method comprising removing coarse aggregate having a smallest dimension of at least 3/16 inches from the concrete slurry with vibrating screen separation apparatus, producing a treated slurry containing sand, fine aggregate, and cement solids, feeding the treated slurry to a hydrocyclone separator, removing fine aggregate with the hydrocyclone separator, producing a secondary slurry, feeding the secondary slurry to a clarifier in which cement solids settle out from the secondary slurry to a bottom of the clarifier and a liquid which is primarily water is disposed above the cement solids, removing the liquid from the clarifier, feeding settled out cement solids in liquid from the clarifier to a centrifuge, and separating settled out cement solids from the liquid in the centrifuge producing an amount of liquid and an amount of settled out cement solids with liquid.

2. The method of claim 1 wherein the coarse aggregate, fine aggregate and cement solids collectively comprise slurry solids, and the slurry solids are about 50% by weight of the concrete slurry.

3. The method of claim 1 wherein the secondary slurry is at most about 8% cement solids by weight.

4. The method of claim 1 further comprising prior to feeding the secondary slurry to the clarifier feeding the secondary slurry to mixing apparatus to homogenize the secondary slurry, and homogenizing the secondary slurry with the mixing apparatus.

5. The method of claim 4 further comprising adding additional water to the secondary slurry in the mixing apparatus to facilitate homogenization.

6. The method of claim 1 further comprising adding flocculant to the secondary slurry to facilitate flocculation of cement solids in the secondary slurry.

7. The method of claim 6 wherein the flocculant is added prior to feeding the secondary slurry to the clarifier.

8. The method of claim 1 wherein the settled out cement solids in liquid fed from the clarifier to the centrifuge comprise at most about 35% of the secondary slurry fed to the clarifier.

9. The method of claim 1 wherein the settled out cement solids in liquid fed from the clarifier to the centrifuge comprise at most about 20% of the secondary slurry fed to the clarifier.

10. The method of claim 1 wherein the amount of settled out cement solids with liquid produced by the centrifuge is at most about 40% to 60% water by weight.

11. The method of claim 1 wherein the amount of settled out cement solids with liquid produced by the centrifuge is at most about 2% water by weight.

12. The method of claim 1 wherein the amount of liquid produced by the centrifuge is at least about 65% of the secondary slurry fed to the clarifier.

13. The method of claim 1 wherein the amount of liquid produced by the centrifuge is at least about 80% of the secondary slurry fed to the clarifier.

14. The method of claim 1 wherein the amount of liquid produced by the centrifuge is at least about 98% water by weight.

15. The method of claim 14 wherein the water is re-usable to make a concrete mixture.

16. The method of claim 1 further comprising feeding the amount of liquid produced by the centrifuge to pH adjustment apparatus to adjust pH of the amount of liquid to between about 7 and about 8.

17. The method of claim 1 further comprising feeding the amount of liquid produced by the centrifuge to filtration apparatus, the liquid containing suspended solids, the filtration apparatus for filtering out from the liquid about 99% by volume of the suspended solids.

18. The method of claim 4 wherein the mixing apparatus is a tank with at least one agitator therein and the method further comprising agitating the secondary slurry in the tank with the agitator to homogenize the secondary slurry.

* * * * *